Nov. 30, 1954  M. E. EVANS  2,695,545
MOTION-PICTURE CAMERA WITH FILM FEED BELT
Filed Feb. 17, 1951  2 Sheets-Sheet 2

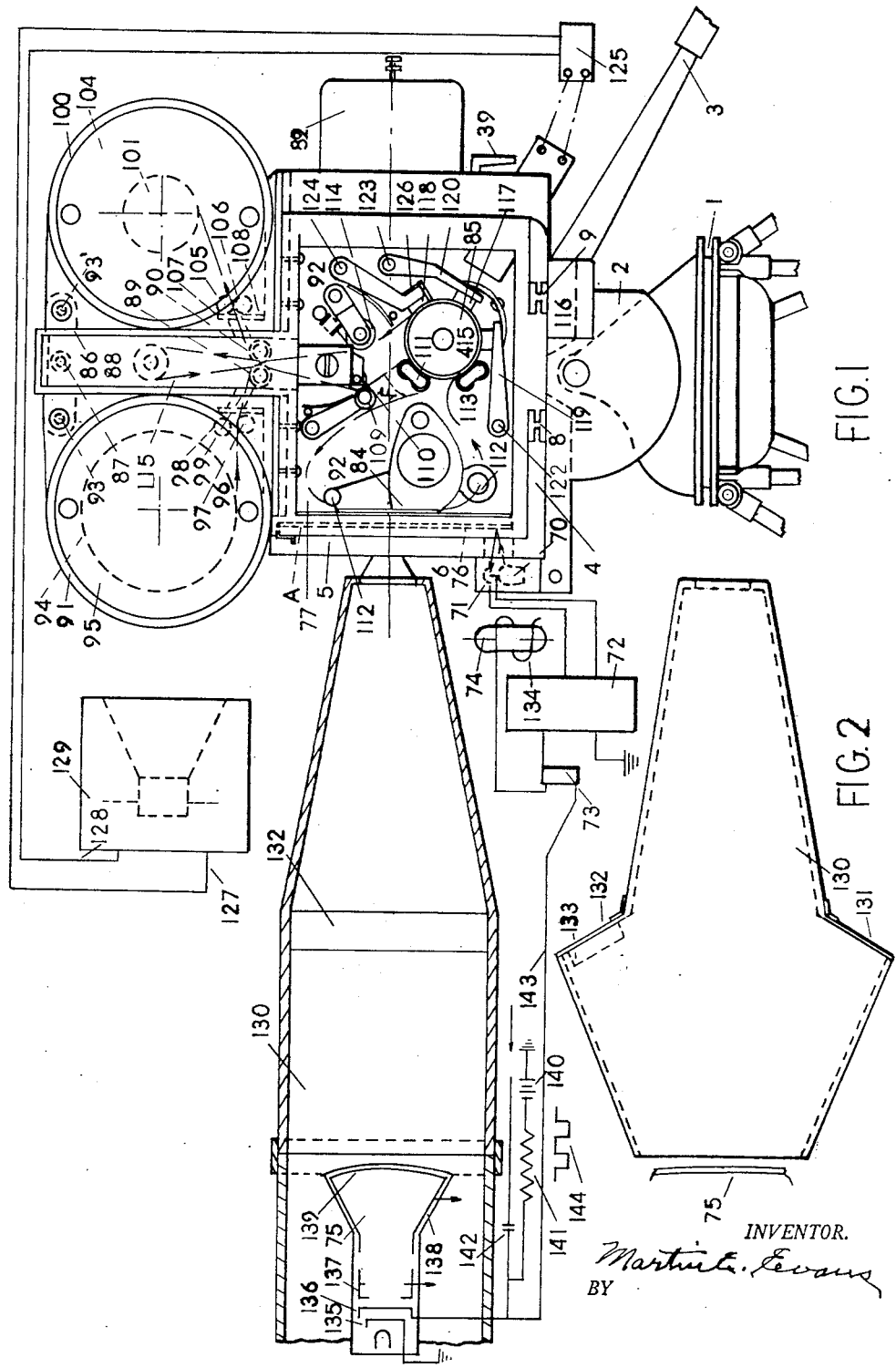

INVENTOR
Martin E. Evans

United States Patent Office 2,695,545
Patented Nov. 30, 1954

2,695,545

MOTION-PICTURE CAMERA WITH FILM FEED BELT

Martin E. Evans, Brooklyn, N. Y.

Application February 17, 1951, Serial No. 211,477

8 Claims. (Cl. 88—18)

This invention relates to motion picture photography and particularly to film transporting mechanisms.

In the usual motion picture apparatus there is provided a drive sprocket rotatable at constant speed pulling the film from a magazine, feeding it to and receiving it back from a loop formed therein. As the film departs from the loop under control of the sprocket it is wound up on a driven wheel in a magazine. In the loop an intermittent pull down mechanism operates to pull successive portions of the film loop into position behind the objective for exposure. Engagement with the film by the pull down is by means of a claw or gear tooth entering a perforation in the film. With 35 mm. film about a ten inch length of the film loop is pulled down each stroke the distance represented by the picture height. To provide the strength required to withstand the pull down operation by present mechanisms at the standard rate of 24 frames per second the film must be of substantial thickness. At present the cost of this film as well as that of the photosensitive emulsion limits the amateur photographer's operations.

With the advent of television with its millions of receivers in the homes, the amateur motion picture photographer's field of operation has increased a million fold, but his operations are limited by his budget. A television sequence runs from fifteen to thirty minutes. To take these sequences with any degree of frequency is beyond the contemplation of the amateur at present because of cost and of limited capacity of the film magazine. The usual 50 ft. or 100 ft. film spools housed in the case with the exposure apparatus are inadequate because they are too short to run the required time. Also, their position in the case so restricts the length of film between the spools and the exposure apparatus that no space is available for deploying the film sufficiently with stabilized motion for recording sound and picture simultaneously.

It is an object of this invention to free the photographic operation from the bondages imposed thereon by the manufacturing practices for cameras and film. This is accomplished by providing means to operate an inexpensive emulsion carrier through the camera pull down mechanism in a length sufficient to accommodate continued filming of sustained action before the camera.

In the operation of recording television pictures on motion picture film simultaneous recording of the sound accompanying the television pictures is desirable. Recording by photographic action on the film is practiced. However, delay in reproduction due to necessity for development first renders this method useless for check up on the recording operation. Other recording methods such as by the use of recording and reproducing stylus or by magnetizable material on the film and magnetizing agencies operative on the magnetic material are available. In these latter instances added stress is placed upon the film by the dragging action of the stylus or magnetizing heads during the recording and monitoring periods.

It is a further object of this invention to provide means to propel an inexpensive emulsion carrier past the operating stations of sound recording and reproducing apparatus which are referably operative simultaneously with the film exposure.

Another object is to provide means to maintain a uniform rate of travel for an inexpensive light weight carrier of a photographic emulsion through sound recording and reproducing positions.

Another object is to provide means to safeguard an inexpensive photo emulsion carrier against rupture in its passage through exposure and sound recording positions.

Television is mentioned not only as a subject for the amateur photographer's activities but also from the standpoint of the communications industry. Other subjects in the photographic field are just as pertinent.

The subject matter here presented is a continuation in part of copending application of October 10, 1949, Serial No. 120,563, now Patent No. 2,661,652, issued December 8, 1953.

Further objects of the invention and novel features will be apparent from the following specification when considered together with the accompanying drawings in which:

Fig. 1 is a front side view of a motion picture camera mounted on a tripod before a television receiver.

Fig. 2 is a plan view of a dark tunnel excluding extraneous light from that passing from the television tube to the camera of Fig. 1.

Figure 3:
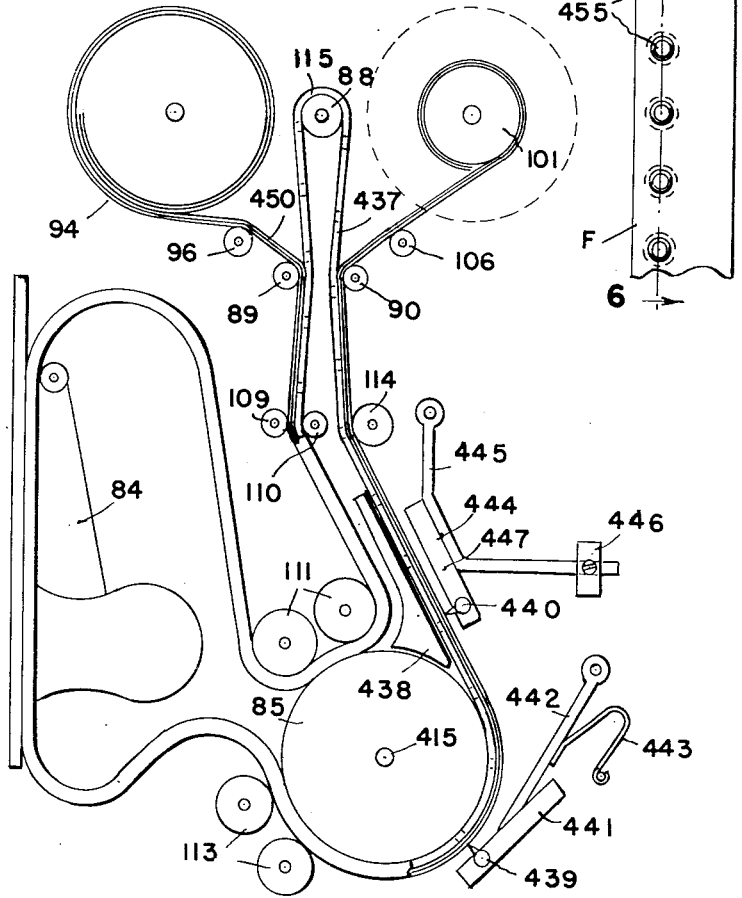
Fig. 3 is an enlarged view in elevation of a film conveying belt as disposed in a camera.

Referring to Fig. 1, on a tripod 1 is mounted a pivoted head 2 with an adjusting handle 3. The head 2 carries a camera base 4 with a front upstanding member 5 on which is mounted lens 6. On the camera base 4 rests camera case 7 with grooved beams 8 and 9 between them holding the case and base in sidewise alignment by tongues from members 4 and 7 fitting the grooves of 8 and 9.

The necessity for beams 8 and 9 arises when the case is shifted laterally relative to the base by means not shown in this application. The case 7 has a front end shutter compartment accessible by movement of the case relative to the cover 5. From motor 82 mounted on the rear of the case 7 extends a drive shaft to the shutter A, and having cross shaft 415 for the drive sprocket 85 and another cross shaft for operation of pull down mechanism 84. The shutter sprocket and pull down operate in timed relationship.

On top of case 7 is a narrow vertical chamber 86 with removable cover 87 and at its bottom connecting approximately midlength with chamber 77. In the chamber 86 is an upper roll 88 and a lower pair of smaller rolls 89 and 90. To the left of the chamber 86 is a film supply magazine 91 held in place by bottom bolts 92 and top bolts 93. In the magazine 91 a film supply reel 94 is rotatably mounted and is accessible by unscrewing of cover plate 95. A pair of rolls 96 and 97 in the magazine 91 guide film as it passes through light trap 98 and aperture 99 into chamber 86 to roll 89. To the right of chamber 86 is a film receiving magazine 100 held in place by bottom bolts 92' and top bolt 93'. In the magazine 100 a film receiving reel 101 is rotatably mounted and power driven through rear pulley and belt not shown. Magazine 100 is closed by screw plate 104. A pair of rolls 105 and 106 in the magazine 100 guide film as it passes from roll 90 on through aperture 107, light trap 108 to receiving reel 101. As the film leaves roll 89 it passes downwardly and between a pair of pressure rolls 109, 110, on to sprocket rolls 111 and sprocket 85, on in a loop to guide roll 112, on through the pull down mechanism 84 and out to a loose loop, then back over pressure rolls 113 and around sprocket 85 again and upwardly to buckle roller 114 and roll 90. In its passage from roll 89 around the path outlined back to roll 90 the film is in contact with an endless belt 115 which extends additionally from roll 90 up around roll 88 and back to roll 89 to complete the endless circuit. The belt is perforated and engages the sprocket and pull down mechanism the same as standard perforated film. When standard film is used the belt and film act as a unit. By matching the perforations the belt acts as a self threading device through the film handling chamber 77. Another use for the belt is described in connection with Figs. 3 and 4.

On the lower side of pull down mechanism is a mounting 112' for a second guide roll 112, thus providing inlet and exit rolls for film and belt to accommodate tight operation of the belt through the pull down passage for high speed continuous operation in connection with stroboscopic photography.

Again referring to Fig. 1, around the feed sprocket 85 magnetic heads 116, 117, 118 are on arms 119, 120, 121 respectively, which are hinged on pins 122, 123, 124 respectively, and spring pressed against the film F on sprocket 85 and an associated guide as the film lifts from the sprocket. The film F carries material suitable for magnetic action by the heads to provide a sound record to accompany the film and be available for immediate replay. Head 116 is an erase coil fed with high frequency energy to demagnetize the recording material. Recording head 117 contains a main audio winding and an auxiliary high frequency coil, the latter in series with the erase coil to secure proper high frequency excitation. The audio winding is preferably energized with signal current from an audio amplifier 125. Head 118 which carries a shield 126 to isolate it from the recording head, supplies an amplifier, not shown, from which the sounds being recorded are recreated and thus an immediate check on the recording is provided.

As shown in Fig. 1, the camera is set up to photograph a television receiver cathode tube screen 139. The accompanying sound signals for the receiver are supplied by leads 127 and 128 to loud speaker 129 from which leads extend to amplifier 125 and to head 117 for recording action on the photographic film. A dark tunnel 130, shown in plan in Fig. 2 and in vertical section in Fig. 1, excludes extraneous light from the lens 6 and tube 75. Access to the tunnel 130 is provided with side doors 131 and 132 which may be opened to provide a full view of tube 75. On door 132 is shown a light meter 133 for gauging the actinic value of the tube 75.

The original television images are usually lacking in contrast, therefore, it is desirable to exclude extraneous light to take full advantage of the contrast of the image on the screen.

Referring to Fig. 3, a diagrammatic representation of the interior parts of a motion picture camera are shown with the invention incorporated. From a supply reel 94 a film F is directed over rolls 96, 89, 110 to sprocket 85 driven by shaft 415 from a motor 82 shown in Fig. 1. Pressure rolls 111 keep the film in top engagement with drive sprocket 85 from which point the film extends in a loop through the film path in intermittent mechanism 84 and back to sprocket 85. The latter point of engagement between the film and sprocket is maintained by pressure rolls 113. The film continues around the sprocket 85 to shoe 438 operative to assure departure of the film from the sprocket. From the shoe 438 the film travels to guide rolls 114, 90 and 106. From the latter the film travels in a varying path determined by the increasing diameter of the film coil as it winds on reel 101. This path of the film is the usual one through the camera. The film's transit is dependent upon the tension within its cross section imparted thereto by sprocket 85 and the pull down mechanism 84 in the absence of an intervening member 115.

Intervening member 115 is disposed as an endless belt following the film path just described and in close contact with the film for the purpose of providing traction thereto preferably by side contact. The belt 115 is short enough to be included within the dark chambers provided for handling the film, thus eliminating interference therewith in movement of the camera from position to position or in its manipulation. The portion of the belt adjacent the supply and takeup reels is looped over a support 88. While this support is shown in a position somewhat remote from rolls 89 and 90 to accommodate ready removal, roll 88 may be adjacent rolls 89 and 90, serving to effect the reversal in the belt path and to maintain the extension from sprocket 85 in taut arrangement. The portion of the belt running through the intermittent mechanism with the film and in intimate contact therewith rises and falls above the intermittent previous to entering and after leaving the intermittent and preferably supports the film during these intervals as well as during the passage through the intermittent. This loop while changing in substance remains of a constant length. It is thus seen that the belt is enclosed by the film, except for the upstanding loop between rolls 89 and 90, thereby providing a maximum area of contact between the belt and film whereby traction from one to the other is maintained.

Perforations 115' in the belt 115 are provided at intervals and of a size suitable for engagement with the sprocket 85 and the intermittent mechanism 84. These perforations have a definite position in relation to means for threading standard film through the mechanisms. The guard 437 is positioned relative to perforations 115' so that perforations in standard film will align with perforations 115'.

As the conveyor 115 and accompanying film pass from feed sprocket 85 and over shoe 438 the shoe acts to lift the conveyor and film off the sprocket and to support the film in position for sound reproduction by stylus 440 acting in groove produced by preceding stylus 439. Member 439 is electromagnetically activated to engrave on the passing film a groove of varying depth or varying width or a combination in a manner well known to the art of recording sound. Member 440 operating in the groove just formed agitates associated electromagnetic means which causes variations in an electric circuit that form the basis for sound reproduction. The stylus 440 immediately following the engraving operation provides an immediate check on the adequacy of the engraving operation. Stylus 439 in case 441 on arm 442 is pivoted to swing toward the sprocket 85 under the impetus of spring 443. Stylus 440 in case 444 on arm 445 is pivoted to swing toward shoe 438 under the impetus of adjustable weight 446 on arm 447.

In the operation of the belt 115 over the sprocket 85, the sprocket teeth have a tendency to effect a ripple action in the belt at the point of departure from the sprocket. The bent portion of the belt around the sprocket 85 has a tendency to continue on around with the belt and an unbending stress must be exerted upon this portion as it departs. A motion stabilizer, set forth in detail in the parent application, assures a uniform rotary motion to that portion of the belt having operative connection therewith, namely the arcuate portion around the sprocket. The steady motion therebeyond is assured for a distance determined by the shoe member 438 by reason of its lateral support to the belt in its running progress from the sprocket 85. Further, by running the belt beyond the shoe 438 in an upward direction the catenary form of belt configuration that the belt would assume if run in a horizontal direction is eliminated with a resultant reduction in vibration. The provision of intermediate stabilizing points 109, 114, 89, and 90 shortens the lateral periods of belt movement. The arcuate contact of the belt between the sprocket 85 and pressure rolls 111 transmits a stabilized oncoming movement to the belt up over the rotary support 88 and back to member 114 and the shoe 438, so that the belt is delivered to and removed from the shoe with actions stabilized through sprocket 85 and the connecting motion stabilizer mentioned. The motion of the belt is thus sectionally stabilized with the sections in contact with the sprocket being best stabilized. This stabilization of the tight belt loop is effected by a minimum of mechanism, that is by the connection 415 between the stabilizer not shown and the sprocket 85.

By providing a relatively long arc of belt contact on sprocket 85 between rolls 113 and shoe 438 as compared with the relatively short like arc between rolls 111 and sprocket 85, the vibratory stresses that might arise from flexing the belt are further removed from the center of the longer arc than from the shorter one and so provide a choice location on the belt and the film thereon for action by the recording contact 439. Since the arc 111—85 does not provide sufficient space for application of the sound reproducer 440, the next best location is that over shoe 438 as shown. The relative positions chosen for members 439 and 440 or their counterparts in various systems reduces the time interval between recording and reproduction and the interval is so short as to give the effect almost of hearing the original sound accompanying the original action. There is a definite distance of advancement of the sound recording by member 439 along the film ahead of the picture recording adjacent pull down 84 in order to make the sound record usable in the projectors commercially installed in theaters and showing places.

Figure 4:
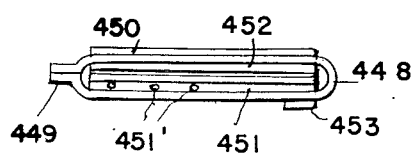
Fig. 4 is a cross sectional view of one form of film adapted to use with the conveyor belt shown in Fig. 3.

Referring to Fig. 4, a composite film is shown comprising a longitudinal strip of material such as cellophane for example, folded along its longitudinal axis as at 448 and having its adjacent folded edges 449 held together as by Scotch tape type of adhesive permitting subsequent separation. Outer surface 450 carries an adhesive of the "Scotch tape" type such as is adapted for separation from conveyor 115. Inner surface 451 is coated with a photographic emulsion. Inner surface 452 is coated with developer and fixer. After exposure it is only necessary to introduce moisture between the surfaces to effect quick development. The emulsion within the envelope and the recording material exteriorally of the envelope are only slightly adhesive and are readily removed if such action is desired, making the envelope again available for use. On the outside of the envelope adjacent to the emulsion 451 is a strip of material 453 adapted to sound recording. If the recording is by stylus the strip is in the nature of a wax or resin coating adapted to engraving. If the recording is by magnetic means, the strip is of material accepting alteration by magnetic means and suitable to the requirements for permanent record. The thickness of emulsion is determined by transparent particles 451' embedded in the emulsion which act as separators when the two surfaces of the envelope are pressed together, particles of hardened emulsion.

From another aspect the envelope may be regarded as a part of the mechanism for advancing the work piece through the housing since it is subject to repeated use, the work piece being the emulsion in one case, the sound recording material in another case and the combined emulsion and sound recording material in another case. With the magnetic recording material permanently attached to the envelope, the sound record must be transcribed from the record before the envelope may be reused. Passing the envelope through the mechanism automatically removes the magnetic record when the erasing head is active so that no separate action is required to prepare for sound recording. Only one aspect of emulsion insertion in the envelope has been presented. However, the invention contemplates inclusion of the full field of placement of emulsion in the envelope. The advantages of this method of handling emulsion through the camera and elsewhere are very great. The emulsion may have a thickness of one thousandth of an inch. The usual base has thickness of five one thousandths of an inch. By handling the emulsion alone in the usual film containers their capacity is increased many fold. The deterioration in storage is only that of the emulsion. The deterioration of the usual base is a cause for great concern at present which this invention meets in a new and novel manner. The combination of an envelope carrying the removable emulsion and the belt carrying the envelope is an operating unit of the mechanism.

The combination of an enveloping strip and a propelling belt with pressure adhesive means therebetween to assure their joint movement and mutual reinforcement when progressively engaged within a housing adapted to either picture recording, sound recording or a combination of such is newly provided by this invention.

In operation the leading end of standard film is uncoiled from coil 94 and inserted between guard 437 and its support 115 until the apertures in both members are in register then the guard 437 is temporarily closed upon the contained film in a manner to retain the film as by temporary adhesive or other means illustrated. As the combined film and belt pass beyond pressure roll 89 their measured lengths are practically the same and they travel as a unit through the operating path led by guard 437 to roll 90 above which the guard 437 is released. The end of the film is then attached to take up reel 101.

In similar manner other film not having perforations may be started through the film path under the lead of guard 437. In this case some form of temporary bond between the film F and the belt is desirable to retain intimate contact between the film and belt. Many ways of establishing this temporary union are available. One form employs an adhesive on the film on the reverse side. Another employs adhesive on the belt. The preferred form is the adhesive on the film for the temporary type of adhesive serves to hold the supply reel in the wound state thereby maintaining a light proof coil where suitable non halation backing is provided. With adhesive surface 450 progressively pressed against the belt 115 by roll 89 and other rolls 111, 113 and 114, the intimate contact between belt and film is maintained up to roll 90 which serves as a fulcrum over which the film is bent in the stripping operation. The progressive movement of the belt 115 with film F attached thereto by adhesive 450 provides distributed tractive force along the face of the film F so that the unit cross sectional stress in the film is low enough to adapt material of the characteristics of cellophane to the use as an emulsion carrier.

Figures 5, 6:
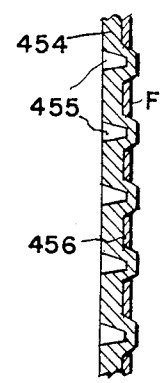
Fig. 5 is a plan view of a portion of a belt with film held thereon by protuberances thereon.
Fig. 6 is a section of Fig. 5 along line 6—6.

Referring to Figs. 5 and 6, a section of a flexible belt 454 is shown with protuberances 455 frictionally engaging film F by protruding through openings therein. The protuberances are spaced to match up with apertures in the film adapted to frictional engagement. Where this form of conveyor is used the modifications of the pressure rolls and guides to accommodate passage of the extensions are obvious. The extensions 455 may have center openings 456 to take engagement with pull down mechanism of either the claw or gear type. While the pull down mechanism shown is of the claw type, gear engagement with Geneva drive movement may also be used. The degree of engagement between the film and the extensions is intended to be such as to accommodate readily the on and off actions of the parts involved as described in connection with Fig. 3. The entrance of the claw or gear into the hollow of the protuberances serves in some cases to expand the material resiliently to transmit the force of the jaw or gear to the film. The frequent engagement points between the belt and the film serve to materially relieve the operating stresses in the film and so make inexpensive thin transparent carriers of the photo emulsion available.

Figure 7:
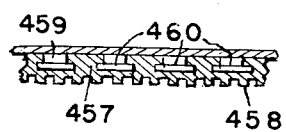
Fig. 7 is a section of Fig. 8 along line 7—7.
Figure 8:
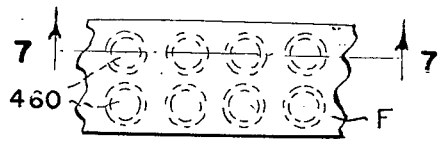
Fig. 8 is a plan view of another form of belt section holding a film by suction and having a toothed surface for driving action.

Referring to Figs. 7 and 8, a section of a rubber belt 457 is shown with the teeth 458 on the drive side to engage claw or gear driving means. On the film side of the belt are provided flexible lips 459 around openings 460 forming vacuum cups in the belt which by their action hold the belt and film in engagement. The lips 459 normally extend beyond the outer plane of the belt. When the pressure roll, say 89, presses the film against the belt, the lips are depressed into the opening 460, the air is partially expelled, and as belt and film pass on air pressure on film and belt hold them together during their transit of the operating path until roll 90 is encountered and assists in the breaking of the vacuum and release of the film for rewinding in the take up magazine.

It is obvious that various combinations other than those shown may be arranged for the purpose of imparting motion to the film by the belt along the film's operating route. For an example of combination use of the devices illustrated for imparting motion to the film by the belt, the film shown in Fig. 4 and belt shown in Figs. 7 and 8 with flap 437 of Fig. 3 may be threaded together as in Fig. 3. The spaces between teeth 458 may be regarded as the equivalents of openings 115' in the belt 115 of Fig. 3 for engagement with sprocket 85. The vacuum cups illustrated in Figs. 7 and 8 may be provided on the member 115 of Fig. 3. With adhesive surface 450 on the film 448 approaching the belt 457 over roll 89 the adhesive surface engages the lips 459 and presses them into the cups 460 and makes contact with the belt 457 or 115, as you choose, and over the area between the cups 460. In this event the adhesive action of the surface 450 of the film and the suction action of the vacuum cups combine to maintain union of the film and the belt during their joint transit from the outside supply 94 through the camera case 7 and back to the exterior storage reel 101. The initiation of this transit is effected by introduction of the leading end of the film behind flap 437. The termination of the transit is effected by removal of the leading end of the film from the flap and attachment of said end to the coil or reel 101. Individual illustration further does not appear necessary. The pressure adhesive 450 may be carried by belt 115 in which case its repetitious use on oncoming film in time lowers its holding power by reason of gradual attrition, portions tearing away and departing with the film, moisture content lowering and tackiness lowering. The essential feature is that the adhesive means acts between the belt and the film carrier. To this end the adhesive means should be between the belt and the film carrier as they receive pressure adequate to effect the required adhesion. For consolidation of operating structure the adhesive 450 is shown in Fig. 3, as coiled in spiral form with the film F. Otherwise it would necessarily be coiled in spiral form alone with its separate mounting and be fed therefrom to space between film F or 448 and belt 115 as they pass over pressure roll 89. The term "pressure adherent means" is descriptive of both "adhesive surface" and "vacuum cup" holding means.

Where sound recording and reproducing means utilizing contact means on the film are employed, the contact produces a drag or retarding action on the film that introduces material stresses. The use of the belt adherent to the film permits transfer of this stress to the belt and so relieves the film so that size increase in the film to handle the additional stress is not required.

Preliminary to the recording of sound the selection of the film suitable to the operation is required. While pivotally supported members 444 and 445 are represented as operating with point contacts for recording and reproducing, they are replaceable with magnetic recording and reproducing means not shown but particularly adapted to the film shown in Fig. 4. The magnetic means operate with surface contact on portion 453 of the film adapted to magnetic operation. Accordingly the suitable recording apparatus is positioned in harmony with the film as shown in Fig. 1.

The advantages of my invention heretofore described are enhanced if the tractive contact between the film and the belt is extended. Other than adhesive, means not shown, such as direct physical engagement, are contemplated for transferring tractive force from the belt to the film. It will be apparent that various arrangements and devices other than those I have illustrated and described may be employed to effect the modes of operation and the results of the mechanical arrangements I have illustrated and described for illustrative purposes. Such arrangements and many variations and modifications of the apparatus illustrated and described will readily occur to those skilled in the art to which the invention is related, and my invention should therefore be understood as not restricted to the specific embodiments illustrated and described but as including all arrangements, modifications, and additions coming within the scope of the following claims.

I claim:

1. In a motion picture camera having an exposure aperture, an intermittent mechanism for feeding film intermittently to said aperture, a continuously rotating feed sprocket for feeding film in a loose loop to and from the intermittent mechanism and aperture, film supply and take up magazines with a dark chamber therebetween, a passage from said chamber to said sprocket, a roller in the chamber between the magazines, an endless film feeding belt maintained in operating connection with said sprocket on opposite sides thereof by holding means and extending from the sprocket past the exposure aperture and back to the sprocket in a loose loop having operating connection with the intermittent mechanism, thence forming a second loop extending from the sprocket through said passage, then reversely over said roller and back to the sprocket, means for attaching the film to the belt, means for establishing contact between the film from the supply magazine and the belt for their joint passage to the sprocket, exposure aperture and intermittent mechanism and back to the take up magazine, means for separating the belt from the film for winding the latter in the take up magazine, said belt being propelled past the exposure aperture by the intermittent mechanism whereby the film is initially threaded through the camera and thereafter intermittently fed past the exposure aperture.

2. Motion picture apparatus of the character described in claim 1 wherein the means for attaching the film to the belt includes a pressure sensitive adhesive layer between the film and the belt.

3. Motion picture apparatus of the character described in claim 1 wherein the means for attaching the film to the belt includes vacuum cups on the belt.

4. Motion picture apparatus of the character described in claim 1 wherein the means for attaching the film to the belt includes projections on the belt to engage the film.

5. Motion picture apparatus of the character described in claim 1 wherein said attaching means includes a slit in said belt in which the leading edge of the film is inserted.

6. Motion picture apparatus of the character described in claim 1 wherein the means for establishing contact between film from the supply magazine with the belt includes means pressing the film against the belt while the latter is taut from pull by the sprocket.

7. Motion picture apparatus as recited in claim 1 wherein said means for attaching the film to the belt includes a roller and said means for separating the belt and film includes another roller.

8. Motion picture apparatus as recited in claim 1 wherein rollers press laterally against the belt to maintain the belt loop portion passing over said dark chamber roller taut.

References Cited in the file of this patent

UNITED STATES PATENTS

| Number | Name | Date |
| --- | --- | --- |
| 560,424 | Petit | May 19, 1896 |
| 1,579,953 | Roble | Apr. 6, 1926 |
| 1,610,818 | Spadone et al. | Dec. 14, 1926 |
| 2,136,209 | Finch | Nov. 8, 1938 |
| 2,220,917 | Schwartz | Nov. 12, 1940 |

FOREIGN PATENTS

| Number | Country | Date |
| --- | --- | --- |
| 388,453 | Germany | Jan. 19, 1924 |